United States Patent
Sakamoto

(10) Patent No.: US 11,369,877 B2
(45) Date of Patent: Jun. 28, 2022

(54) COMPUTER-READABLE NON-TRANSITORY STORAGE MEDIUM HAVING GAME PROGRAM STORED THEREIN, GAME APPARATUS, GAME SYSTEM, AND GAME PROCESSING METHOD FOR PROVIDING USER INTERFACE SHOWING CHANGE IN PARAMETER CORRESPONDING TO AN ADDITIONAL ITEM

(71) Applicant: NINTENDO CO., LTD., Kyoto (JP)

(72) Inventor: Yuki Sakamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/933,251

(22) Filed: Jul. 20, 2020

(65) Prior Publication Data
US 2021/0187396 A1    Jun. 24, 2021

(30) Foreign Application Priority Data
Dec. 24, 2019  (JP) .............................. JP2019-232661

(51) Int. Cl.
*A63F 13/58*    (2014.01)
*A63F 13/537*   (2014.01)

(52) U.S. Cl.
CPC ............ *A63F 13/58* (2014.09); *A63F 13/537* (2014.09)

(58) Field of Classification Search
CPC ................................ A63F 13/58; A63F 13/537
See application file for complete search history.

(56) References Cited

U.S. PATENT DOCUMENTS

| | | | | |
|---|---|---|---|---|
| 6,306,033 B1* | 10/2001 | Niwa | ...................... | A63F 13/10 463/1 |
| 6,676,519 B2* | 1/2004 | Nakazawa | .............. | A63F 13/10 463/31 |
| 6,952,209 B2* | 10/2005 | Ericsson | ............. | G06F 3/04847 345/440 |
| 7,594,847 B1* | 9/2009 | York | ....................... | A63F 13/00 463/5 |
| 9,259,642 B1* | 2/2016 | McNeill | ................ | A63F 13/822 |
| 2002/0045470 A1* | 4/2002 | Atsumi | ................... | A63F 13/56 463/1 |
| 2004/0157662 A1* | 8/2004 | Tsuchiya | ............. | A63F 13/5378 463/32 |

(Continued)

OTHER PUBLICATIONS

Blizzard Entertainment, "Diablo II", 1997, Blizzard Entertainment, pp. 1-89. (Year: 1997).*

(Continued)

*Primary Examiner* — Steve Rowland
(74) *Attorney, Agent, or Firm* — Nixon & Vanderhye, P.C.

(57) ABSTRACT

As a user interface (UI) when changing a wearing item, a UI showing a change in a parameter in a case where a wearing item set to a player object is changed to another wearing item, from a state before the change, is generated. Here, an additional item that adds a change to the parameter independently of the wearing item can be set to the wearing item. The UI is configured such that it is possible to switch between a first display showing a change in the parameter such that an effect of the additional item is reflected and a second display showing a change in the parameter such that the effect of the additional item is not reflected. Change of the wearing item is fixed on the basis of a wearing instruction input.

20 Claims, 15 Drawing Sheets

(56) References Cited

U.S. PATENT DOCUMENTS

| | | | |
|---|---|---|---|
| 2005/0059483 A1* | 3/2005 | Borge | A63F 13/335 |
| | | | 463/29 |
| 2005/0143174 A1* | 6/2005 | Goldman | A63F 13/87 |
| | | | 463/42 |
| 2006/0287027 A1* | 12/2006 | Hardisty | A63F 13/42 |
| | | | 463/8 |
| 2007/0211047 A1* | 9/2007 | Doan | A63F 3/00643 |
| | | | 345/419 |
| 2009/0197658 A1* | 8/2009 | Polchin | A63F 13/02 |
| | | | 463/9 |
| 2010/0088124 A1* | 4/2010 | Diefendorf | G06Q 30/02 |
| | | | 705/4 |
| 2016/0171827 A1* | 6/2016 | Washington | A63F 13/822 |
| | | | 463/22 |
| 2016/0171835 A1* | 6/2016 | Washington | G07F 17/3244 |
| | | | 463/25 |
| 2019/0130701 A1* | 5/2019 | Simons | G07F 17/3223 |
| 2020/0023273 A1* | 1/2020 | Tsurusaki | A63F 13/69 |
| 2020/0051460 A1* | 2/2020 | Bedor | G09B 5/065 |

OTHER PUBLICATIONS

Divinity Original Sin II Wiki, "Runes", 2018, Wiki, pp. 1-2, at https://divinityoriginalsin2.wiki.fextralife.com/Runes, (last visited Nov. 19, 2021). (Year: 2018).*

[Online] Nintendo Co., Ltd., "Xenoblade User Manual (p. 37)", Searched Dec. 13, 2019, https://ml.nintendo.net/docvc/RVL/JPN/SX4J/SX4J_J.pdf, with partial Eng. Translation, 2 pages.

\* cited by examiner

| WEARING ITEM ID | PART INFORMATION | NAME INFORMATION | PERFORMANCE INFORMATION |
|---|---|---|---|
| 0001 | WEAPON | JUNK SWORD | ..... |
| 0002 | PROTECTOR/HEAD | LEATHER CAP | ..... |
| 0003 | PROTECTOR/HEAD | LEATHER ARMOR | ..... |
| ⋮ | ⋮ | ⋮ | ⋮ |

| ADDITIONAL ITEM ID | ADDITIONAL EFFECT INFORMATION |
|---|---|
| 0001 | PHYSICAL DEFENSE +10 |
| 0002 | ATTACKING POWER +3 |
| 0003 | PHYSICAL DEFENSE +2, AGILITY +1 |
| ⋮ | ⋮ |

COMPUTER-READABLE NON-TRANSITORY STORAGE MEDIUM HAVING GAME PROGRAM STORED THEREIN, GAME APPARATUS, GAME SYSTEM, AND GAME PROCESSING METHOD FOR PROVIDING USER INTERFACE SHOWING CHANGE IN PARAMETER CORRESPONDING TO AN ADDITIONAL ITEM

CROSS REFERENCE TO RELATED APPLICATION

The disclosure of Japanese Patent Application No. 2019-232661, filed on Dec. 24, 2019, is incorporated herein by reference.

FIELD

The exemplary embodiments relate to a user interface process when changing a wearing item that is attachable to and detachable from a player object.

BACKGROUND AND SUMMARY

Hitherto, games such as role-playing games in which player objects are equipped with weapons and protectors during play have been known. In addition, these games also include a game in which an additional item can be attached to each weapon or each protector. Such additional items each have an effect. When such an additional item is attached to a weapon or a protector, an effect of the additional item can be added and the performance of the equipment and further the performance of a player object having the equipment can be enhanced. Moreover, a user interface that displays changes in parameters before and after equipment changes, in a screen for changing equipment in such a game, has also been known.

In the above equipment change screen, when equipment to be changed is selected, a value indicating the performance of the equipment including an effect of an additional item is displayed as a value after the change. In this regard, when a player compares the performance of each equipment and determines equipment to be changed, it is difficult for the player to grasp the relationship between the performance of the equipment itself and an effect of an additional item. Therefore, there is room for further enhancement of player's convenience in such a user interface.

Therefore, it is an object of the exemplary embodiments to provide a computer-readable non-transitory storage medium having a game program stored therein, a game apparatus, a game system, and a game processing method that realize a user interface capable of further enhancing a player's convenience in a user interface for changing an item that is attachable to and detachable from a player object.

In order to attain the object described above, for example, the following configuration examples are exemplified.

A configuration example is directed to a computer-readable non-transitory storage medium having a game program causing a computer of an information processing apparatus to execute the following process. Examples of the computer-readable non-transitory storage medium include magnetic media such as a flash memory, a ROM, and a RAM, and optical media such as a CD-ROM, a DVD-ROM, and a DVD-RAM. First, the game program causes the computer to make a selection from among wearing items each of which is set so as to be changeable with respect to a player object in a game and adds a change to a parameter regarding ability of the player object in the game on the basis of a set effect, on the basis of a selection operation input. The game program also causes the computer to generate a user interface showing the currently selected wearing item and showing a change in the parameter in a case where the wearing item set to the player object is changed to the currently selected wearing item, from a state where the wearing item set to the player object is not changed. To at least one of the wearing items, an additional item that is added so as to be attachable to or detachable from the wearing item and for which an effect of adding a change to the parameter independently of the wearing item is set is set. The game program further causes the computer to switch between a first display showing a change in the parameter such that the effect of the wearing item and the effect of the additional item set to the wearing item are reflected, and a second display showing a change in the parameter such that the effect of the additional item is not reflected and the effect of the wearing item is reflected, in the user interface on the basis of a first switching instruction input. Then, the game program causes the computer to set the selected wearing item to the player object on the basis of a wearing instruction input.

According to the above configuration example, a change in a performance parameter before and after change of a wearing item can be displayed so as to switch between a content in which the effect of an additional item is reflected and a content in which the effect of the additional item is not reflected. Accordingly, it is possible to provide a user interface from which the relationship between the performance of the wearing item and the additional item effect is easily grasped, so that the player's convenience can be improved.

In another configuration example, frames for setting the additional item may be individually set for the wearing items. Furthermore, the additional item may be capable of being added to the wearing item within a range where the frame is not exceeded, and the game program may further cause the computer to set the additional item to the wearing item on the basis of an addition instruction input.

According to the above configuration example, a strategy about how to set the additional items can be given, so that the entertainment characteristics of the game can be enhanced. Also, it is possible to provide a user interface that is easy to see in such a case, so that the player's convenience can also be enhanced.

In another configuration example, parts may be set in the player object, and the wearing item may be set to each of the parts.

According to the above configuration example, the wearing item can be attached to and detached from each part provided in the player object. The player's convenience when performing an operation for changing such a wearing item can be further enhanced.

In another configuration example, the game program may further cause the computer to switch between a parameter change display by the first display or the second display and an item details display showing detailed information about the currently selected wearing item itself, in the user interface on the basis of a second switching instruction input different from the first switching instruction input.

According to the above configuration example, it is possible to provide a UI from which detailed information about the wearing item itself can be confirmed in addition to a change in the performance parameter. Accordingly, the player's convenience can be further improved.

In another configuration example, the detailed information about the currently selected wearing item itself and detailed information about the wearing item itself currently set to the player object may be displayed in the item details display.

According to the above configuration example, it is possible to provide a UI that can be used selectively for comparison and confirmation of a change in the performance parameter before and after change of the wearing item and for comparison of the performance of the wearing item itself. Accordingly, the player's convenience can be further improved.

According to the exemplary embodiments, as a user interface when changing a wearing item, it is possible to provide a user interface having higher convenience.

BRIEF DESCRIPTION OF THE DRAWINGS

FIG. 11 illustrates a non-limiting example of the data structure of wearing item master data;

FIG. 12 illustrates a non-limiting example of the data structure of additional item master data;

DETAILED DESCRIPTION OF NON-LIMITING EXAMPLE EMBODIMENTS

Hereinafter, one exemplary embodiment will be described. It is to be understood that, as used herein, elements and the like written in a singular form with the word "a" or "an" attached before them do not exclude those in the plural form.

Figure 1:
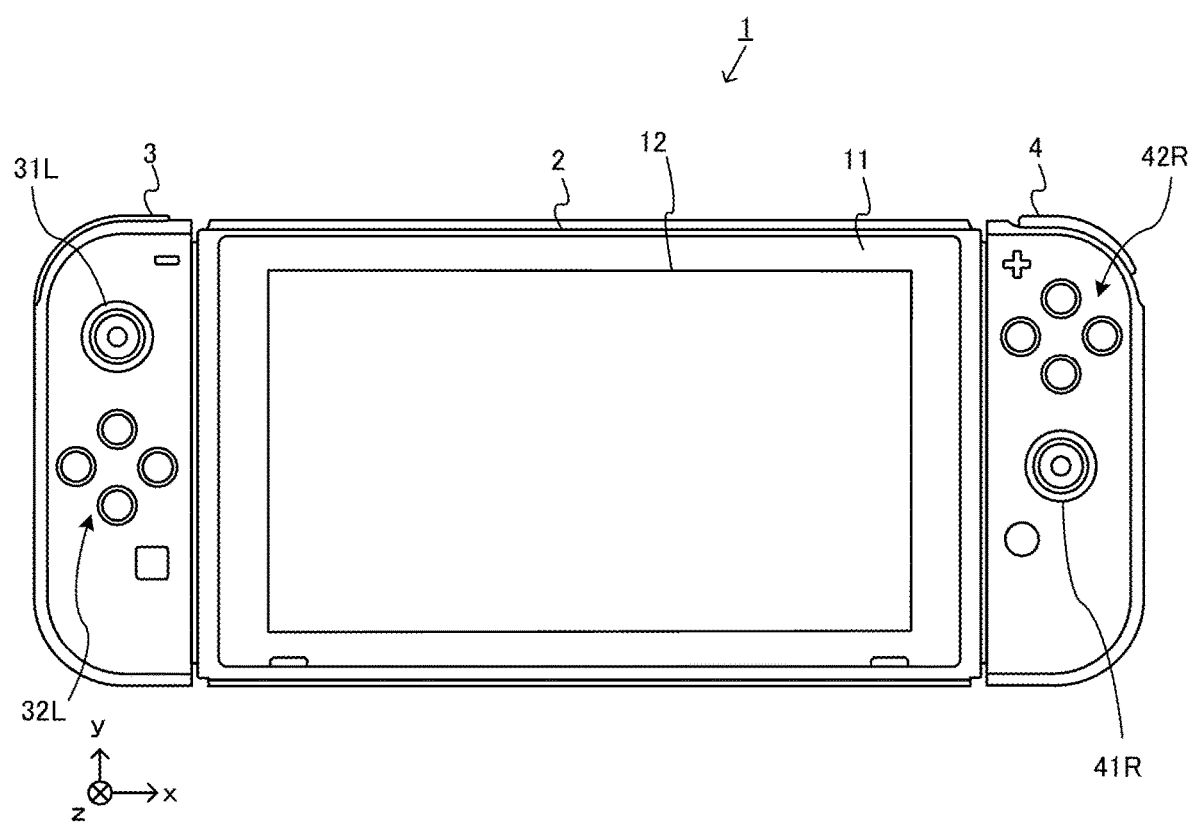
FIG. 1 is an external view showing a non-limiting example of a game system 1.

First, an information processing system for executing information processing according to the exemplary embodiment will be described. In the exemplary embodiment, a game system will be described as an example of the information processing system. This game system may be any system. As an example, FIG. 1 shows an external view of a game system used in this example. The game system 1 shown in FIG. 1 includes a main body apparatus (information processing apparatus; which functions as a game apparatus main body in the exemplary embodiment) 2, a left controller 3, and a right controller 4. The main body apparatus 2 is an apparatus that executes various types of processing (for example, game processing) in the game system 1. The main body apparatus 2 includes a substantially plate-shaped housing 11, and includes a display 12 on a main surface (in other words, a front-side surface of the housing 11). In addition, the main surface is roughly rectangular. The left controller 3 and the right controller 4 are each a device including an operation section for a player to perform an input. Specifically, the left controller 3 includes an analog stick 31L and a button section 32L. The right controller 4 includes an analog stick 41R and a button section 42R. The left controller 3 and the right controller 4 are attachable to and detachable from the main body apparatus 2. In this example, the game system 1 will be described as a unified apparatus obtained by attaching each of the left controller 3 and the right controller 4 to the main body apparatus 2. In another exemplary embodiment, the main body apparatus 2, the left controller 3, and the right controller 4 may also be used as separate bodies.

Figure 2:
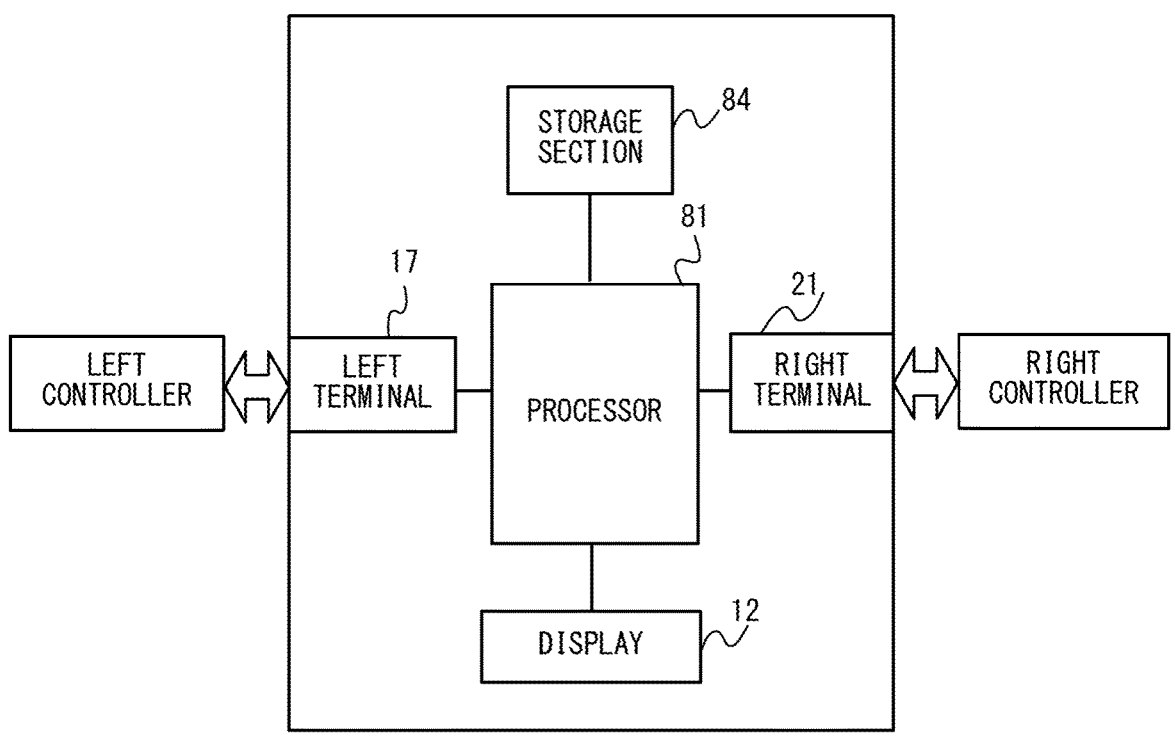
FIG. 2 is a block diagram showing a non-limiting example of the internal configuration of a main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section 84. The storage section 84 may be, for example, an internal storage medium such as a flash memory and a dynamic random access memory (DRAM), or may be configured to utilize an external storage medium mounted to a slot that is not shown, or the like.

Furthermore, the main body apparatus 2 includes: a left terminal 17 that is a terminal for the main body apparatus 2 to perform wired communication with the left controller 3; and a right terminal 21 that is a terminal for the main body apparatus 2 to perform wired communication with the right controller 4.

Furthermore, the display 12 is connected to the processor 81. The processor 81 displays a generated image (e.g., an image generated by executing the above information processing) and/or an externally acquired image on the display 12.

[Controllers]

Although not shown, the left controller 3 and the right controller 4 each have the above-described button section and analog stick, and further include a communication control section that communicates with the main body apparatus 2. In a state where the left controller 3 and the right controller 4 are attached to the main body apparatus 2, wired communication can be performed via the left terminal 17 and the right terminal 21. The communication control section acquires information regarding an input (specifically, information regarding an operation) from each input section of the controller. Then, the communication control section transmits operation data including the acquired information (or information obtained by performing predetermined processing on the acquired information) to the main body apparatus 2. It should be noted that the operation data is transmitted repeatedly, once every predetermined period of time. It should be noted that the interval at which the information regarding an input is transmitted from each of the input sections to the main body apparatus 2 may or may not be the same. In the case of using the main body apparatus 2 and the left controller 3 and the right controller 4 as separate bodies, communication with the main body apparatus 2 can be performed through wireless communication without being performed via the terminals.

[Outline of Game Processing]

Next, an outline of operation of processing executed by the game system according to the exemplary embodiment will be described. The processing described in this example is processing regarding a user interface (hereinafter, UI) when changing a wearing item of a player object.

Here, wearing items in a game will be described. In this game, various wearing items can be set to a player object. These wearing items are, for example, items such as weapons and protectors in a role-playing game (RPG). By setting these wearing items to the player object, parameters regarding the ability of the player object can be changed. For example, in the case of a weapon, a parameter that is "attacking power" of the player object can be changed. In the case of a protector, a parameter that is "defense power" of the player object can be changed. For example, in the case where the player object has a motif of a robot, parts that make up the robot and can be changed, for example, head parts, body parts, arm parts, etc., also correspond to the wearing items. In the following description, the case of a fantasy RPG will be described as an example with the case where wearing items are weapons and protectors as an example.

Furthermore, in the game assumed in this example, it is possible to set or detach items called additional items to or from the respective wearing items. The additional items are items that can add various effects to wearing items. Specifically, some of the wearing items appearing in this game have a frame called "slot" in which an additional item can be set (in other words, wearing items that do not have such a slot can be present). In addition, different effects are set for the additional items. For example, effects such as "attacking power+10" and "defense power+10" are set (a plurality of effects may be set for one additional item). For example, when an additional item having an effect of "attacking power+10" is set in a slot of a weapon for which attacking power is set as 10, it is possible to increase the attacking power of the player object by 20 by setting the weapon to the player object. Meanwhile, when this weapon is set to the player object in a state where the additional item is not set, the attacking power is increased by 10.

As for the number of slots that each wearing item individually has, in this example, for convenience of description, the case where the maximum number of slots is one will be described as an example. Moreover, a description will be given on the assumption that it is possible to set one additional item in one slot. However, in another exemplary embodiment, the number of slots may be any number. In addition, a different number of slots may be provided for each wearing item.

As described above, in the game assumed in the exemplary embodiment, wearing items have "slots", and additional items can be set in the slots. Accordingly, it is possible to change a parameter of the player object with a content obtained by adding a change amount set for an additional item to a change amount set for a wearing item.

Next, operation and a UI when changing such a wearing item will be described using screen examples. For example, when a player selects an item "equipment change" from a predetermined menu, a UI described below is provided to the player.

Figure 3:
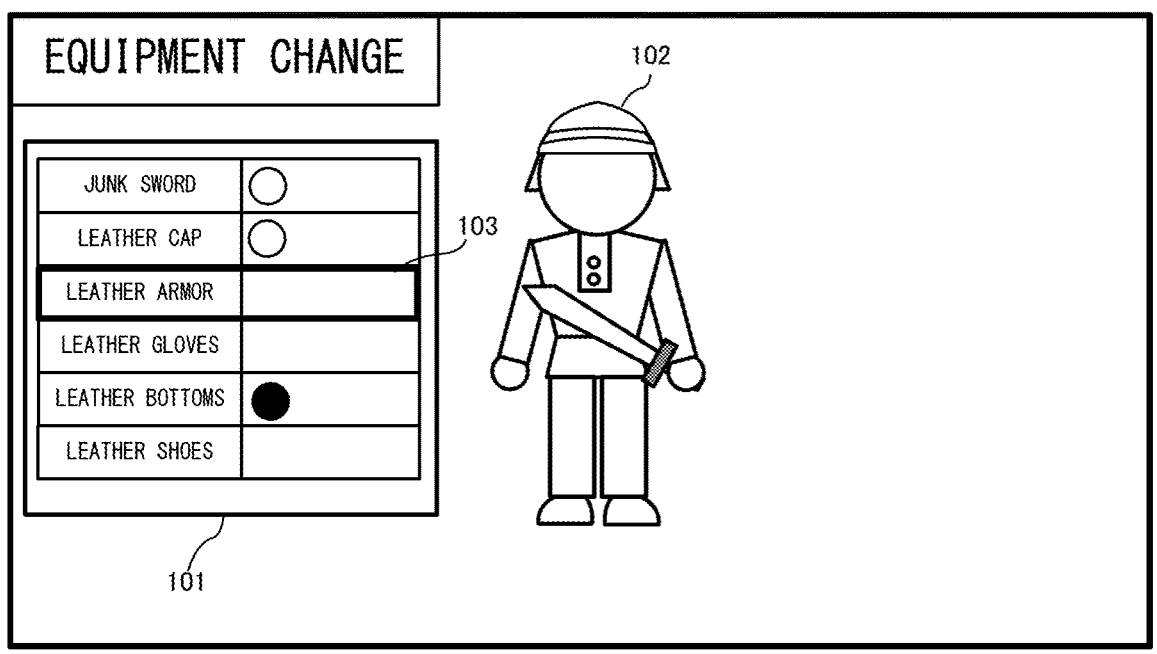
FIG. 3 illustrates a non-limiting example of a game screen.

FIG. 3 illustrates an example of a screen initially displayed after the above "equipment change" is selected. In FIG. 3, a part selection window 101 and a player object 102 are displayed. Here, in the game assumed in this example, a plurality of "parts" to which wearing items can be set are provided. Specifically, six parts, that is, "weapon", "protector/head", "protector/body", "protector/arm", "protector/waist", and "protector/leg", are provided. The part selection window 101 in FIG. 3 shows wearing items that are currently set to the respective parts. In addition, the part selection window 101 is also a window for a player to select a part where the wearing item is to be changed. In the example of FIG. 3, the respective parts are displayed in a list in which the parts are arranged vertically. On the left side in the list, the names of the respective wearing items are displayed. In addition, on the right side in the list, circles are shown and each indicate whether there is the slot. The example of FIG. 3 shows that wearing items "junk sword", "leather cap", and "leather bottoms" each have a slot. Moreover, as for display of the slot, the display form differs depending on whether the additional item is set. In the example of FIG. 3, the display form of the slot display of "leather bottoms" is different from those of the slot display of the other items and indicates that some sort of additional item is set. In addition, it is indicated that the slots of "junk sword" and "leather cap" are empty.

Figure 4:
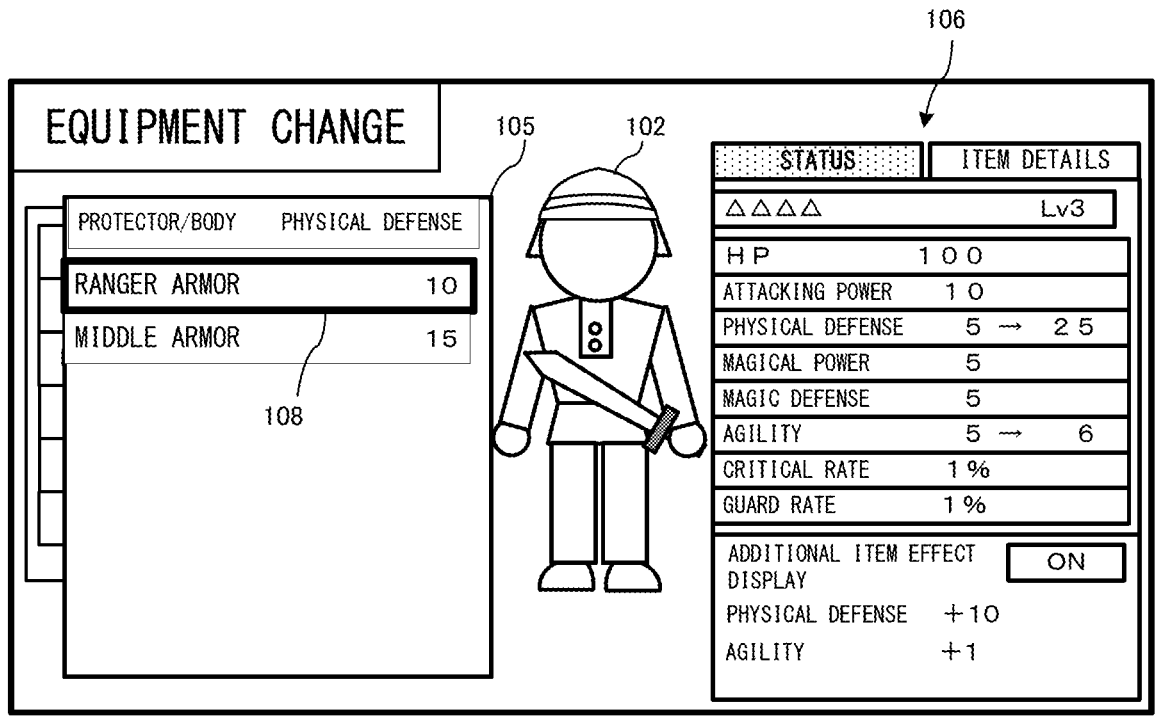
FIG. 4 illustrates a non-limiting example of a game screen.

In the screen of FIG. 3, the case where the player performs an operation for selecting, for example, the "protector/body" (the third part from the top in the part selection window 101) as a part to be changed is assumed. Specifically, the player moves a cursor 103 shown as a black frame in FIG. 3 to an item "leather armor", and presses a button for decision. In this case, a screen shown in FIG. 4 is displayed. In FIG. 4, an item selection window 105 is displayed so as to be superimposed on the part selection window 101. In addition, a details window 106 is also displayed on the right side of the player object 102.

In FIG. 4, the item selection window 105 is a window for allowing the player to select a wearing item to be changed. In the item selection window 105, wearing items that are possessed by the player object 102 and correspond to the selected part are displayed in a list format. The player can bring any of the wearing items into a "currently selected state" by moving a cursor 108 shown as a black frame in FIG. 4 (the default position of the cursor 108 is the display position of the wearing item at the top of the list). Then, the player can set the wearing item in the "currently selected state" to the player object 102 by performing a "wearing instruction operation" for fixing the selection content. In the example of FIG. 4, two wearing items, a "ranger armor" and a "middle armor", are shown. Moreover, in this example, the "ranger armor" has an effect of increasing "physical defense" by "10", and the "ranger armor" has an effect of increasing "physical defense" by "15".

Here, in the following description, it is assumed that the above-described additional items have already been set to the above two wearing items. Specifically, it is assumed that an additional item that increases physical defense by "10" and agility by "1" has already been set to the "ranger armor". In addition, it is assumed that an additional item that increases physical defense by "2" has already been set to the "middle armor".

Figure 5:
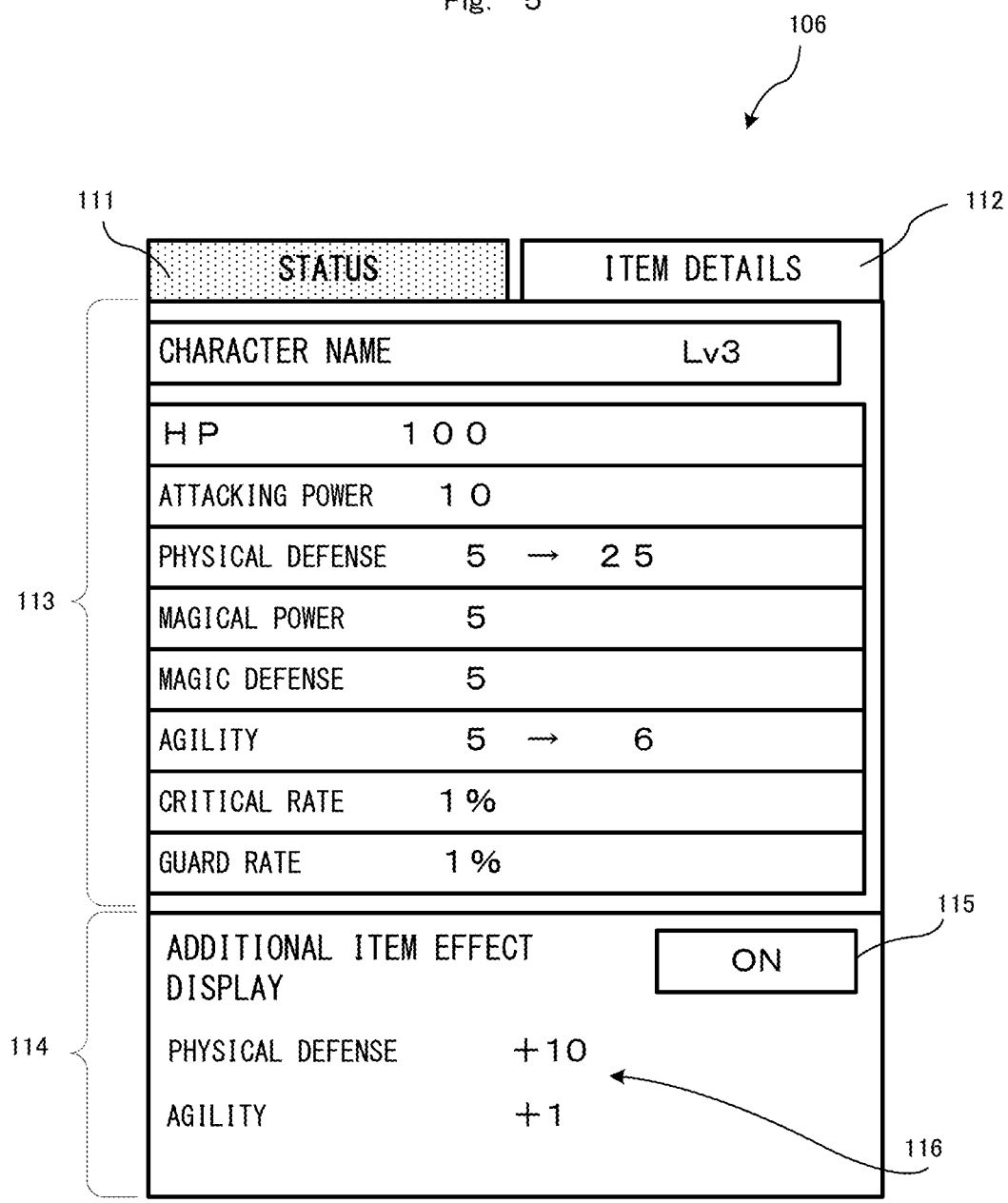
FIG. 5 illustrates a non-limiting example of a game screen.

The details window 106 is a window for showing detailed information about the wearing item in the "currently selected state". FIG. 5 shows an enlarged view of the details window 106. The details window 106 includes a status tab 111 and an item details tab 112. The player can switch information displayed in the details window 106, by selecting any of the tabs. FIG. 5 shows a state where the status tab 111 is selected. When the status tab 111 is selected, information about change in the status of the player object by the wearing item in the "currently selected state" is displayed in the details window 106. When the item details tab 112 is selected, information about the wearing item in the "currently selected state" itself is displayed in the details window 106. In the following description, the display content of the details window 106 when the status tab 111 is selected is referred to as "status detailed information display". In addition, the display content of the details window 106 when the item details tab 112 is selected is referred to as "item detailed information display".

Next, specific contents displayed in the status detailed information display will be described. In the example of FIG. 5, the status detailed information display includes a status change display area 113 and an additional item related area 114. The status change display area 113 shows how performance parameters of the player object 102 are changed when the wearing item in the "currently selected state" is set to the player object 102. Specifically, the character name and the current level are shown near the upper end of the status change display area 113, and each performance parameter of the player object 102 is displayed as information in one row below the character name and the current level such that the performance parameters are arranged vertically. In each row, the name of the performance parameter, the current value, and a value after change are shown. The example of FIG. 5 shows that "physical defense" is changed from 5 to 25 and "agility" is changed from 5 to 6 when the "ranger armor" is set to the player object 102.

Figure 6:
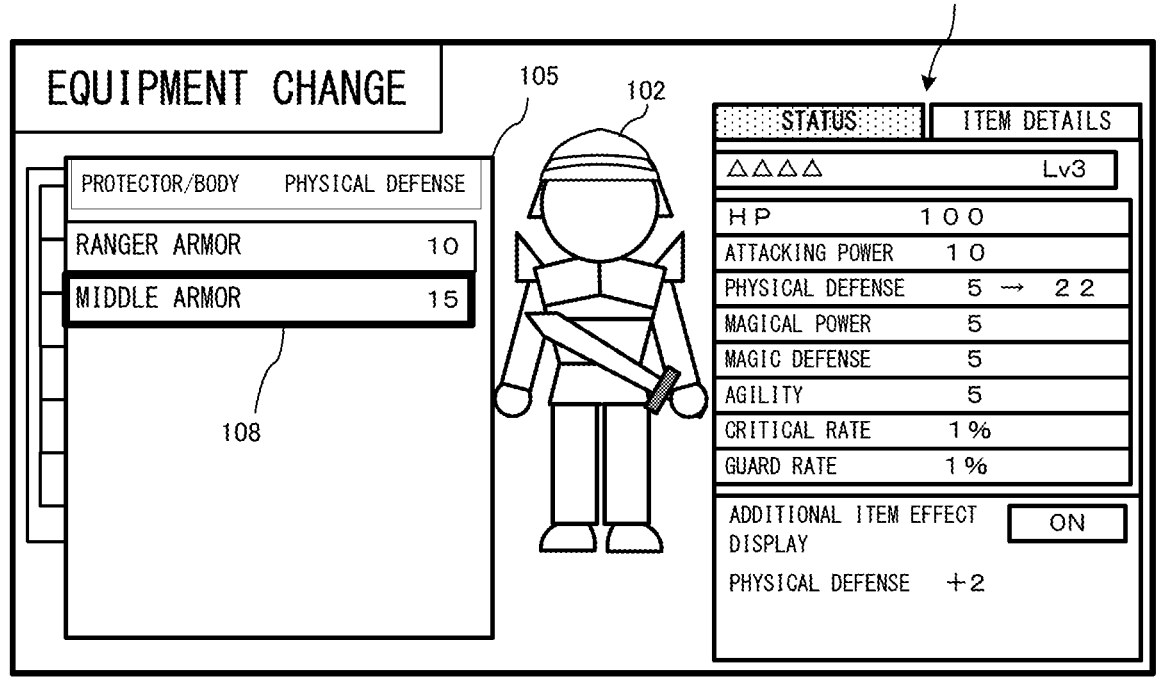
FIG. 6 illustrates a non-limiting example of a game screen.

FIG. 6 shows an example of a screen when the cursor 108 is moved down by one row from the state of FIG. 4 and the "middle armor" is selected. In this case, the status detailed information display in FIG. 6 shows that the "physical defense" is changed from 5 to 22 when the "middle armor" is set to the player object 102. Here, focusing on the change of the "physical defense", when FIG. 4 and FIG. 6 are compared, the physical defense can be increased more when the "ranger armor" is set, than when the "middle armor" is set.

In the exemplary embodiment, in accordance with an operation for changing a wearing item in the item selection window 105, the wearing item in the "currently selected state" is reflected in the appearance of the player object 102. In the example of FIG. 6, a state where the "middle armor" is set to the body part of the player object 102 is displayed.

Referring back to FIG. 5, the additional item related area 114 will be described next. In FIG. 5, the additional item related area 114 includes an effect display switching button 115 and an additional effect content display 116. The additional effect content display 116 is a display showing the specific effect content of the additional item that is set to the wearing item in the "currently selected state". The effect display switching button 115 is a button for switching a display mode of the status change display area 113. The display mode includes an "effect reflection mode" in which display is performed such that the effect of an additional item is reflected, and an "effect non-reflection mode" in which display is performed such that the effect of an additional item is not reflected. In this example, when the effect display switching button 115 is "ON", the "effect reflection mode" is set, and, when the effect display switching button 115 is "OFF", the "effect non-reflection mode" is set.

In the case of the "effect reflection mode", a value obtained by reflecting the effect of an additional item is displayed as a display content in the status change display area 113. In the case of FIG. 5, the effect display switching button 115 is "ON". Thus, the content of change in the "physical defense" and the content of change in the "agility" are contents in which the effect of the additional item is reflected. In the example of FIG. 5, the change amount (increase amount) of the "physical defense" is "20". For this, a total value of "20" obtained by adding "10", which is an increase value for the "physical defense" by the additional item effect, to "10", which is the value of the "physical defense" of the "ranger armor" itself, is reflected.

Figure 7:
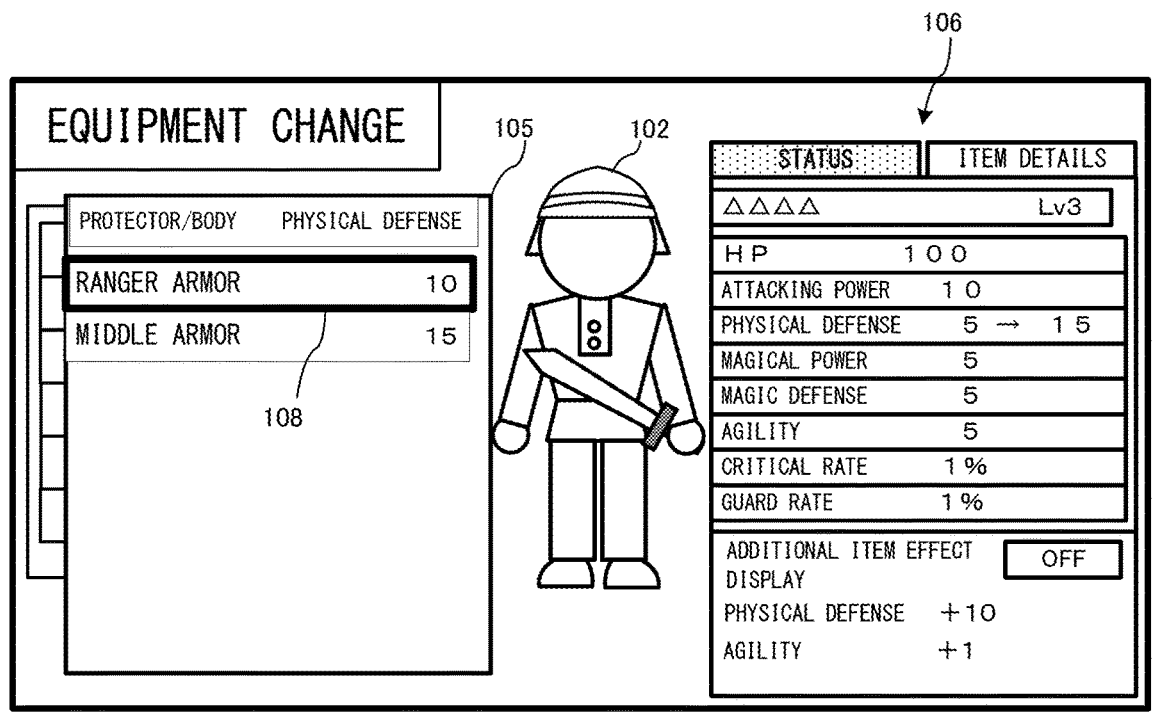
FIG. 7 illustrates a non-limiting example of a game screen.
Figure 8:
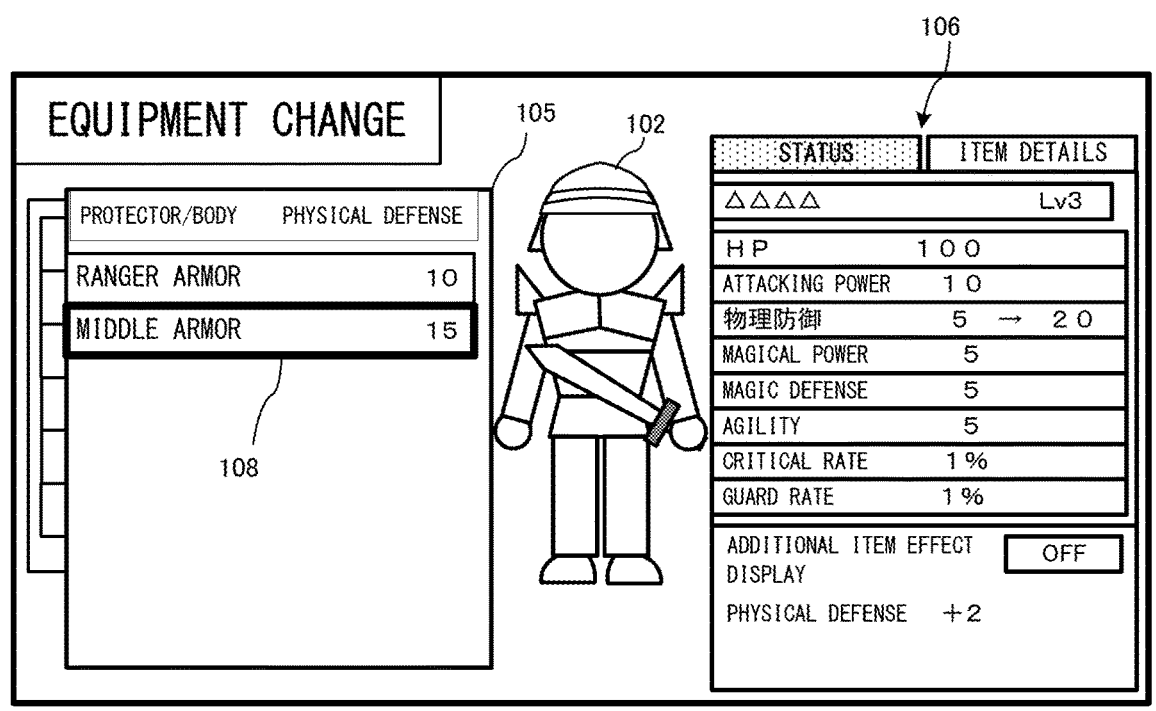
FIG. 8 illustrates a non-limiting example of a game screen.

FIG. 7 and FIG. 8 each show an example of a screen in the case of the "effect non-reflection mode". FIG. 7 shows the case where the wearing item in the "currently selected state" is the "ranger armor", and FIG. 8 shows the case where the wearing item in the "currently selected state" is the "middle armor". In FIG. 7, the change content of the "physical defense" is a content in which the effect of the additional item is not reflected. That is, a change based on the "physical defense" of the "ranger armor" is shown. In addition, as for the "agility" which is changed in FIG. 4, a change is not shown in FIG. 7. This is because the change of the "agility" is based on the additional item and is not based on the "ranger armor" itself. Moreover, in the case of FIG. 8, similarly, the change content of the "physical defense" is also based on the "physical defense" of the "middle armor" itself.

Also, as for display of the current values of the performance parameters, in the "effect non-reflection mode", values in which the effect of the additional item is not reflected are displayed. In addition, in the "effect reflection mode", the current values are also shown as values in which the effect of the additional item is reflected.

Here, when FIG. 7 and FIG. 8 are compared focusing on the "physical defense", the physical defense is increased more with the "middle armor" than with the "ranger armor", unlike the above case. That is, when the performance of the wearing items is compared, it is found that the "middle armor" has higher performance than the "ranger armor". In such a case, in order to further improve the physical defense of the player object 102, it can be said that there is also an option to temporarily remove the additional item set to the "ranger armor" and reset the additional item to the "middle armor". In the exemplary embodiment, it is possible to switch between the above-described two display modes by operations on the effect display switching button 115, so that it is easy to compare the change of the parameter depending on the presence/absence of the additional item effect. Therefore, it can be expected to assist the player in determining, for example, which wearing item and which additional item to use in combination, on the basis of such a wearing item change, thereby improving the player's convenience.

In the above example, the example of displaying both the current value and the value after the change has been described as a method of representing the change in the ability parameter. The representation method is not limited thereto, and the following representations may be used. For example, only the value after the change may be shown, and whether the parameter value is increased or decreased may be shown by a text color. For example, when the parameter value is increased, the value after the change is displayed in blue, and when the parameter value is decreased, the value after the change is displayed in red. In addition, a representation in which the specific value is not shown and whether the parameter is increased or decreased is recognized may be used.

Figure 9:
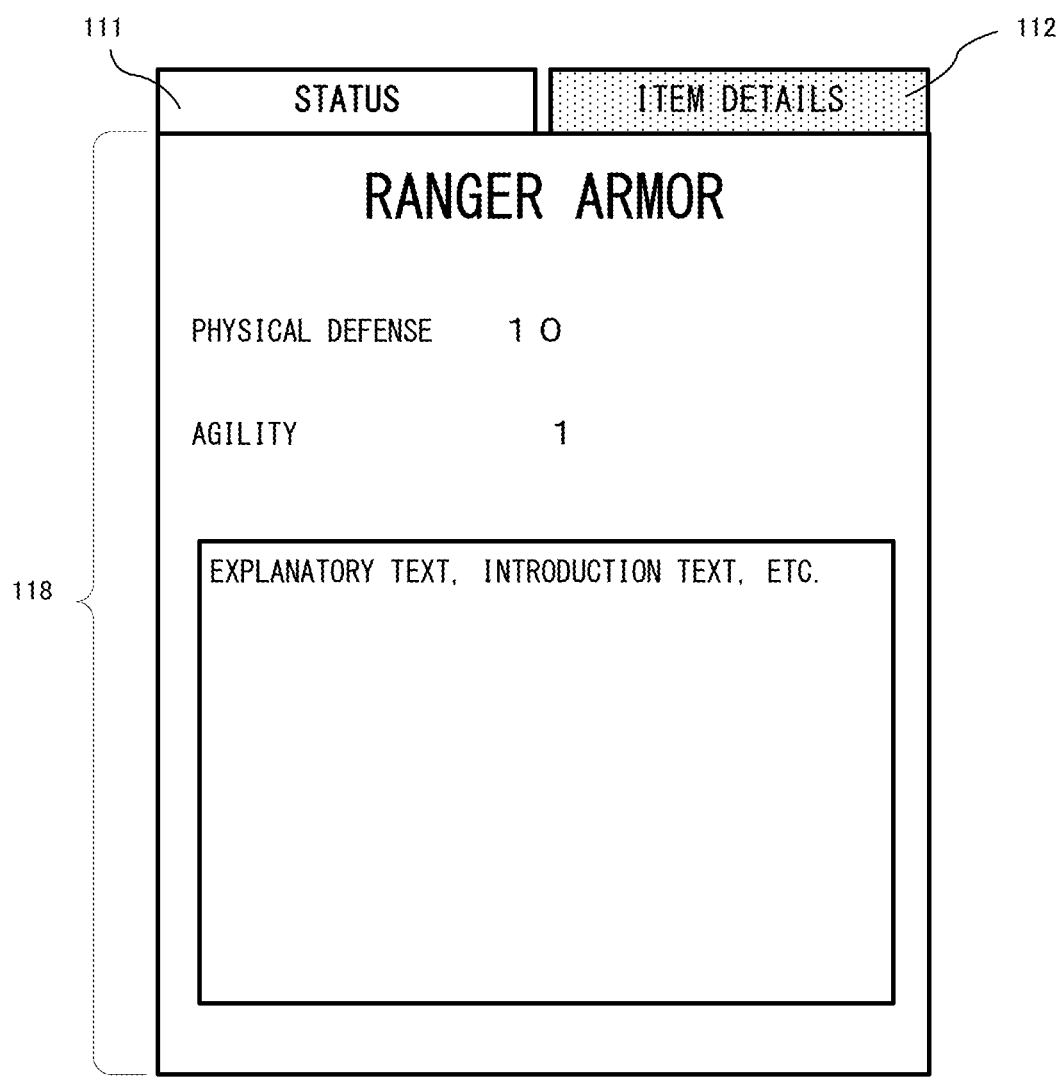
FIG. 9 illustrates a non-limiting example of a game screen.

Next, the contents displayed in the item detailed information display will be described. FIG. 9 shows an example of the details window 106 when the item details tab 112 is selected. In the item detailed information display, detailed information about the wearing item in the "currently selected state" itself is displayed in an item details display area 118 (meanwhile, in the "status detailed information display", all ability parameters of the player object 102 are displayed). For example, a display showing the performance of the wearing item, and explanatory text, introduction text, etc., of the wearing item are displayed.

Moreover, in the exemplary embodiment, when the "item detailed information display" is displayed, although detailed illustration is omitted, an item detailed information window regarding the currently set wearing item is also displayed. This window is displayed at substantially the center of FIG. 4 to the left of the details window 106 (so as to be superimposed on the item selection window 105 and the player object 102). As a result, the detailed information about the currently set wearing item and detailed information about the wearing item in the "currently selected state" are displayed side by side. Accordingly, a UI in which information about wearing items is easily compared is provided.

[Details of Game Processing of the Exemplary Embodiment]

Next, the game processing in the exemplary embodiment will be described in more detail with reference to FIGS. 10 to 19. Hereinafter, the process regarding the "equipment change" described above will be mainly described, and the description of other game processing is omitted.

[Data to be Used]

Figure 10:
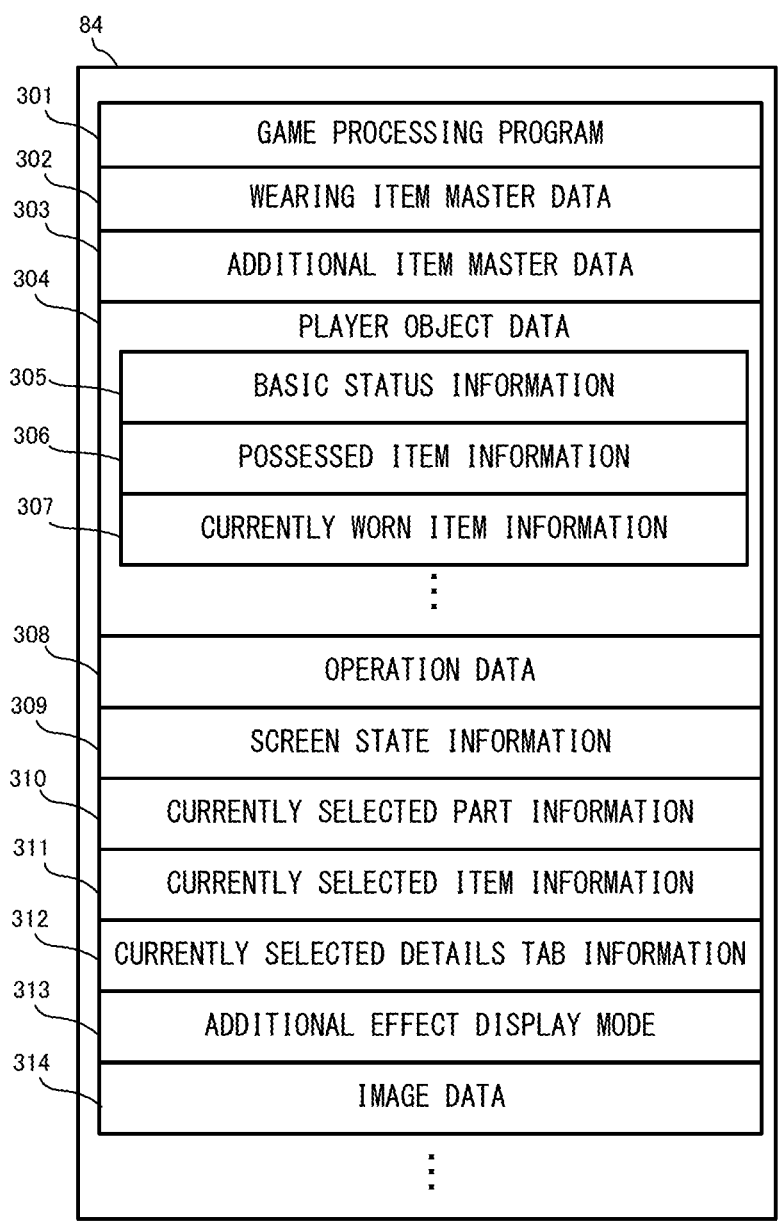
FIG. 10 illustrates a memory map showing a non-limiting example of various kinds of data stored in a storage section 84.

First, various kinds of data to be used in the game processing will be described. FIG. 10 illustrates a memory map showing an example of various kinds of data stored in the storage section 84 of the main body apparatus 2. In the storage section 84 of the main body apparatus 2, a game processing program 301, wearing item master data 302, additional item master data 303, player object data 304, operation data 308, screen state information 309, currently selected part information 310, currently selected item information 311, currently selected details tab information 312, an additional effect display mode 313, image data 314, etc., are stored.

The game processing program 301 is a program for executing game processing including the process regarding the "equipment change". A program for executing processes in flowcharts in FIGS. 13 to 19 described later is also included.

The wearing item master data 302 is data that defines the wearing items appearing in the game assumed in the exemplary embodiment. FIG. 11 shows an example of the data structure of the wearing item master data 302. The wearing item master data 302 is data in a table format including at least items such as a wearing item ID 3021, part information 3022, name information 3023, and performance information 3024. The wearing item ID 3021 is information for uniquely identifying each wearing item. The part information 3022 is information indicating a part where the wearing item can be worn. The name information 3023 is information for displaying the name of the wearing item on a screen. The performance information 3024 is information indicating the performance of the wearing item. That is, the performance information 3024 is information that defines a value or an amount by which an ability status of the player object 102 is changed. For example, the performance information 3024 is information indicating that the "physical defense" is "10", or the "attacking power" is "20". Moreover, information indicating the presence/absence of the "slot" and the number of "slots" is also included.

Referring back to FIG. 10, the additional item master data 303 is data that defines the above additional items appearing in the game assumed in the exemplary embodiment. FIG. 12 shows an example of the data structure of the additional item master data 303. The additional item master data 303 is data in a table format including at least items such as an additional item ID 3031 and additional effect information 3032. The additional item ID 3031 is information for uniquely identifying each additional item. The additional effect information 3032 is information indicating the effect of the additional item, and a value or an amount by which an ability status of the player object 102 is changed is defined.

Referring back to FIG. 10, the player object data 304 is data regarding the player object 102. The player object data 304 includes basic status information 305, possessed item information 306, currently worn item information 307, etc. The basic status information 305 is information indicating ability parameters of the player object 102 itself. That is, the basic status information 305 is information indicating ability parameters of the player object 102 in a state where none of the wearing items and the additional items is set. In addition, the ability parameters of the player object 102 itself are increased as the level of the player object 102 rises. The possessed item information 306 is information indicating wearing items possessed by the player object 102 (for example, the wearing item ID 3021). In addition to this information, information indicating an additional item that is set in the slot of each wearing item possessed by the player object 102 is also included. The currently worn item information 307 is information indicating which of the wearing items possessed by the player object 102 is currently set to the player object 102 (that is, information indicating the current equipment content).

The operation data 308 is data acquired from the left controller 3 and the right controller 4, and is data indicating the content of an operation performed by the player. The operation data 308 includes data indicating pressed states of various button sections of each controller, data for indicating the content of an operation on the analog stick, etc.

The screen state information 309 is information to be used in processes described later, and indicates the state of the screen in the "equipment change". Specifically, the screen state information 309 is information for identifying whether the current state is a state where a part is currently selected (the state in FIG. 3) or a state where a wearing item is currently selected (the states in FIGS. 4 and 6 to 8). In this example, as information indicating the former, information "during part selection" is set as the screen state information 309. In addition, as information indicating the latter, information "during item selection" is set as the screen state information 309.

The currently selected part information 310 is information indicating a part designated as a target where the wearing item is to be changed. In other words, the currently selected part information 310 indicates which part is selected in the part selection window 101.

The currently selected item information 311 is information for indicating the wearing item in the "currently selected state", and is also information indicating which wearing item is selected from the item selection window 105.

The currently selected details tab information 312 is information indicating which tab is selected from the status tab 111 and the item details tab 112 in the details window 106. In this example, information indicating the "status detailed information display" or the "item detailed information display" is set. The former indicates a state where the status tab 111 is selected, and the latter indicates a state where the item details tab 112 is selected.

The additional effect display mode 313 is information indicating whether the above-described display mode of the status change display area 113 is the "effect reflection mode" or the "effect non-reflection mode". When "ON" is set, the "effect reflection mode" is indicated, and, when "OFF" is set, the "effect non-reflection mode" is indicated.

The image data 314 is data of various kinds of images to be displayed in the game processing.

In addition, various kinds of data to be used in the game processing are stored in the storage section 84 as necessary.

[Details of Processes Executed by the Processor 81]

Next, the processing in the exemplary embodiment will be described in detail with reference to the flowcharts of FIGS. 13 to 19. As described above, here, the process regarding the "equipment change" (hereinafter, referred to as wearing item change UI process) will be mainly described.

Figure 13:
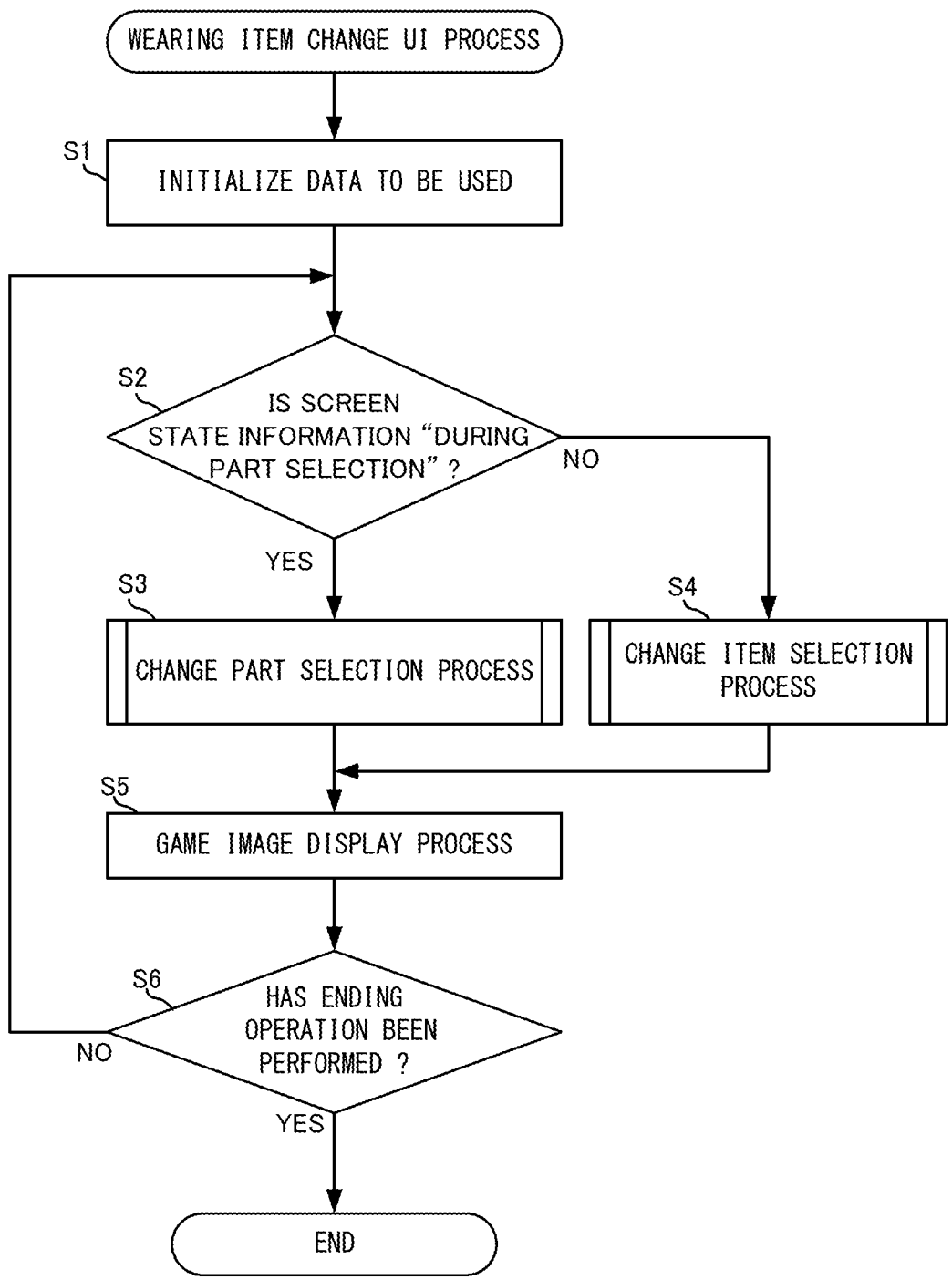
FIG. 13 is a flowchart showing game processing according to an embodiment in detail.

FIG. 13 is a flowchart showing the wearing item change UI process in detail. Execution of this process is started, for example, when the player selects the item "equipment change" from the predetermined menu.

First, in step S1, the processor 81 initializes data to be used in processes described below. Specifically, the processor 81 performs the following process. First, the processor 81 sets "during part selection" as the screen state information 309. The processor 81 brings the currently selected part information 310 and the currently selected item information 311 into a state where no data is set therein. The processor 81 sets information indicating that the status tab 111 is selected is set, in the currently selected details tab information 312. The processor 81 sets the "effect reflection mode" for the additional effect display mode 313.

Next, in step S2, the processor 81 determines whether "during part selection" is set as the screen state information 309. As a result of the determination, if "during part selection" is set (YES in step S2), the processor 81 executes a change part selection process in step S3. On the other hand, if "during part selection" is not set (that is, if the current state is during item selection) (NO in step S2), the processor 81 executes a change item selection process in step S4.

[Change Part Selection Process]

Figure 14:
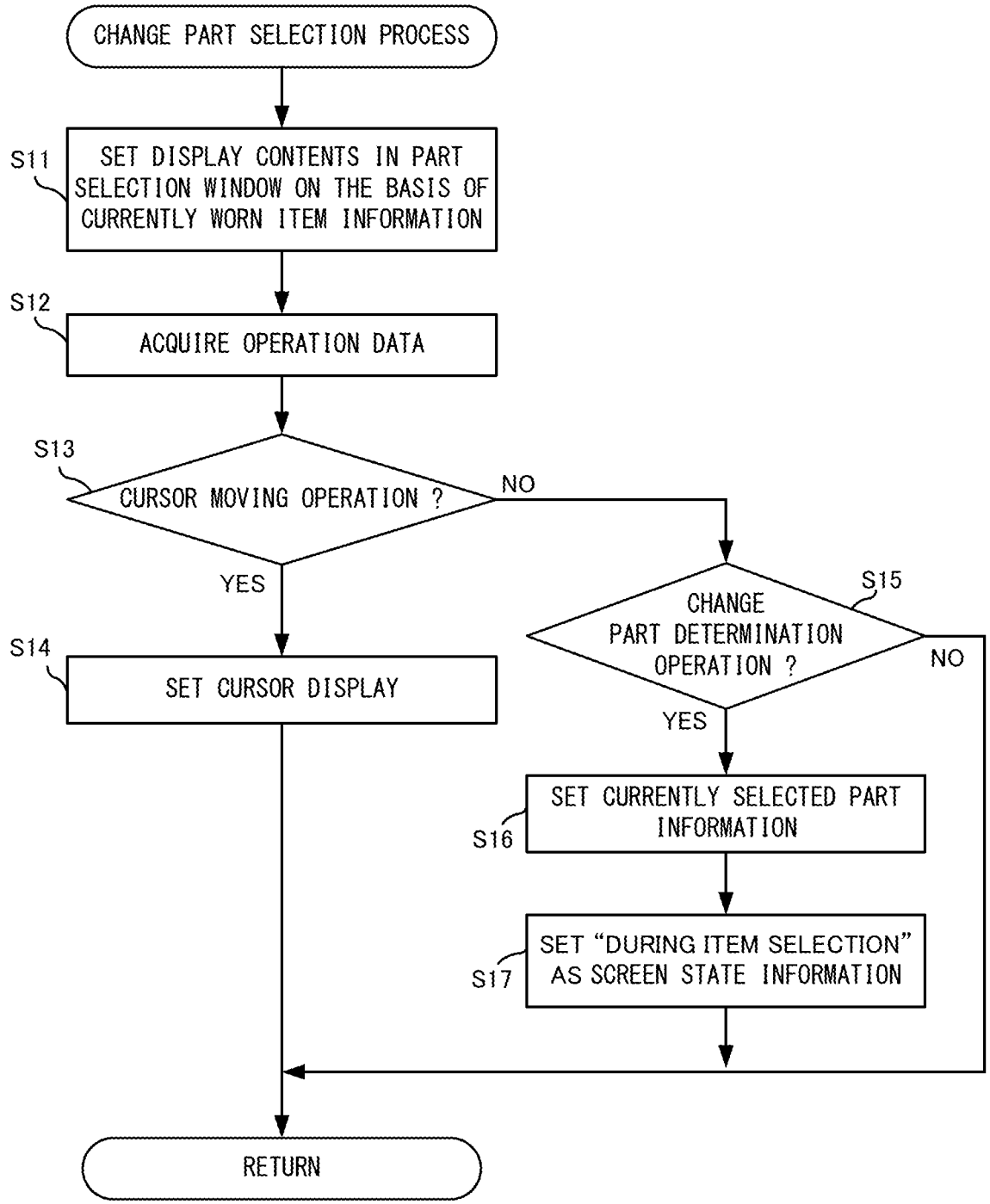
FIG. 14 is a flowchart showing a change part selection process in detail.

FIG. 14 is a flowchart showing the change part selection process in step S3 in detail. This process is a process regarding an operation for selecting a part where the wearing item is to be changed, in FIG. 3. In FIG. 14, first, in step S11, the processor 81 sets contents to be displayed in the part selection window 101, on the basis of the currently worn item information 307. Specifically, the processor 81 generates an image to be displayed in the part selection window 101 and writes the image to a frame buffer (not shown) (in the following description, for "setting of display contents", writing to a frame buffer is similarly assumed).

Next, in step S12, the processor 81 acquires the operation data 308. Subsequently, in step S13, the processor 81 determines whether an input of an operation for moving the cursor 103 has been performed. If an operation for moving the cursor 103 has been performed (YES in step S13), the processor 81 performs display setting such that the cursor 103 is displayed at a position corresponding to a movement destination, on the basis of the content of the operation, in step S14. Thereafter, the processor 81 ends the change part selection process.

On the other hand, if a cursor moving operation has not been performed (NO in step S13), the processor 81 determines subsequently in step S15 whether an operation for determining a change part has been performed, on the basis of the operation data 308. As a result of the determination, if a determination operation has not been performed (NO in step S15), the processor 81 ends the change part selection process. On the other hand, if a determination operation has been performed (YES in step S15), in step S16, the processor 81 sets information indicating the determined part, in the currently selected part information 310. Furthermore, in step S17, the processor 81 sets "during item selection" as the screen state information 309. Then, the processor 81 ends the change part selection process. Thereafter, the processor 81 advances the processing to step S5 in FIG. 13.

[Change Item Selection Process]

Figure 15:
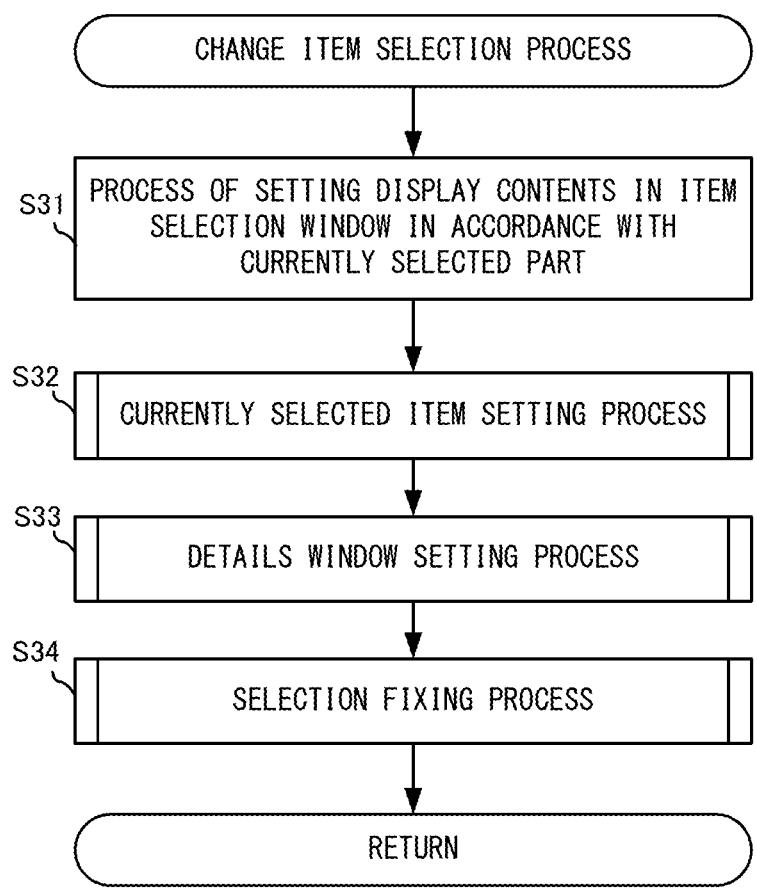
FIG. 15 is a flowchart showing a change item selection process in detail.

Next, the change item selection process in step S4 will be described in detail. FIG. 15 is a flowchart showing the change item selection process in detail. First, in step S31, the processor 81 sets contents to be displayed in the item selection window 105 in FIG. 4, etc., in accordance with a currently selected part. For example, if the currently selected part is the "protector/body", the processor 81 extracts a wearing item for which the part information 3022 is the "protector/body", from the possessed item information 306. Then, the processor 81 sets contents to be displayed in the item selection window 105, on the basis of the extracted contents. Specifically, the processor 81 performs display setting such that information (names, performance values, etc.) about wearing items excluding the wearing item currently set to the player object 102 from the extracted contents is displayed in a list in the item selection window 105.

[Currently Selected Item Setting Process]

Figure 16:
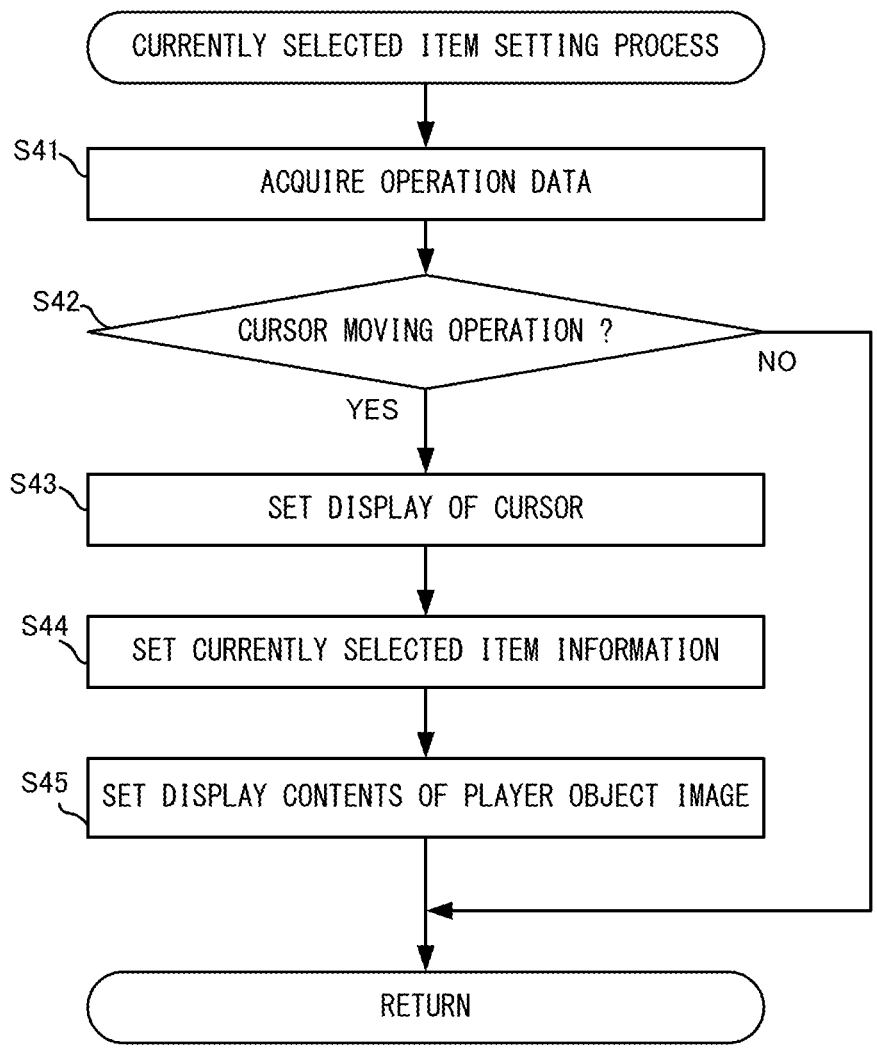
FIG. 16 is a flowchart showing a currently selected item setting process in detail.

Next, in step S32, the processor 81 performs a currently selected item setting process. This process is a process for identifying and setting a currently selected item from the item selection window 105. FIG. 16 is a flowchart showing the currently selected item setting process in detail. In FIG. 16, first, in step S41, the processor 81 acquires the operation data 308. Subsequently, in step S42, the processor 81 determines whether the operation content indicated by the operation data 308 is an input of an operation for moving the cursor 108. As a result of the determination, if the operation content is not a cursor moving operation (NO in step S42), the processor 81 ends the currently selected item setting process. On the other hand, if the operation content is a cursor moving operation (YES in step S42), in step S43, the processor 81 determines a display position of the cursor 108 in accordance with the operation content and sets display contents such that the cursor 108 is displayed at that position.

Next, in step S44, the processor 81 sets the currently selected item information 311 in accordance with the above operation content. That is, the processor 81 performs a process of bringing the wearing item at which the cursor 108 is disposed, into the "currently selected state".

Next, in step S45, the processor 81 performs display setting such that the wearing item in the "currently selected state" is reflected in the appearance of the player object 102.

This is the end of the currently selected item setting process.

[Details Window Setting Process]

Figure 17:
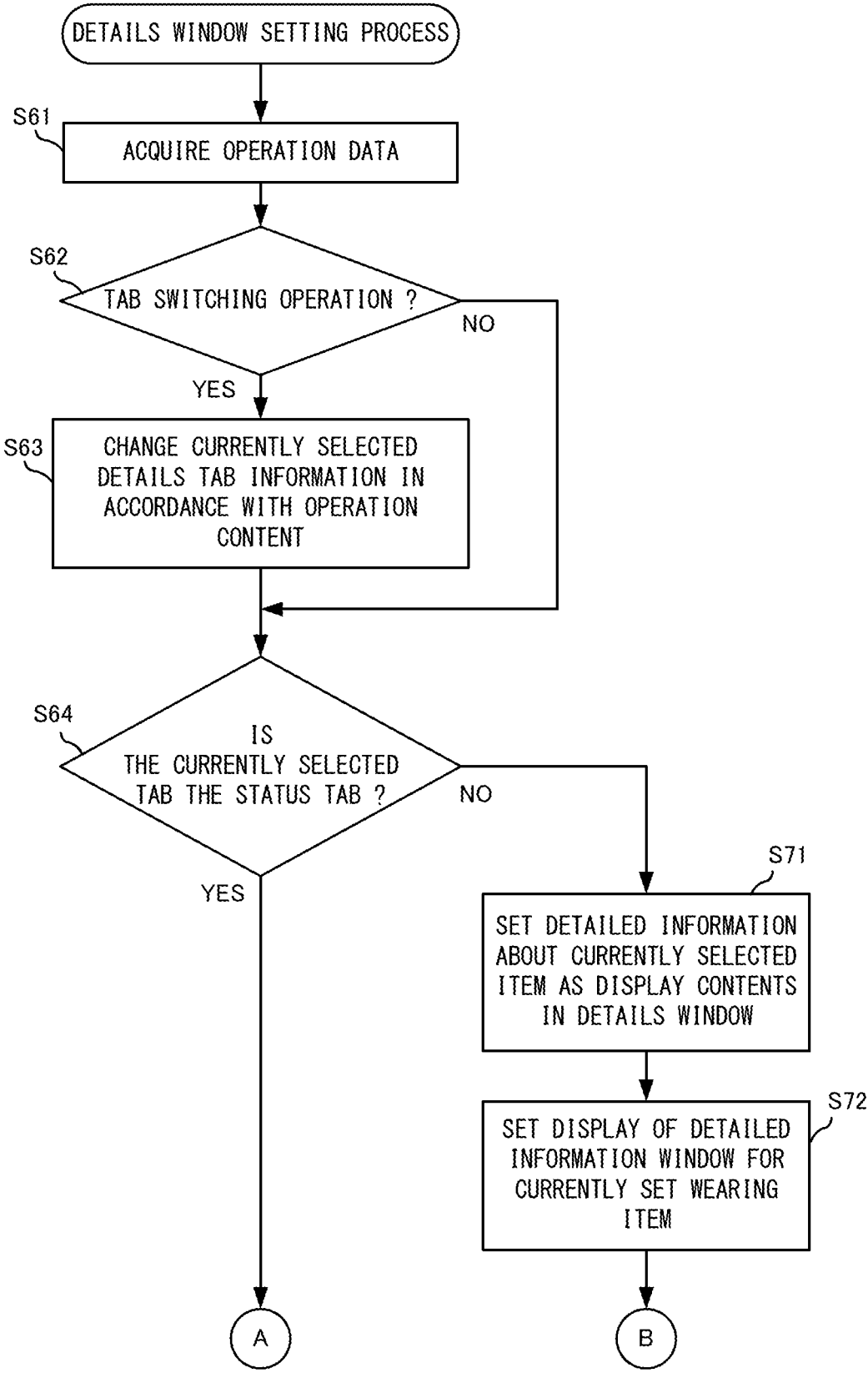
FIG. 17 is a flowchart showing a details window setting process in detail.
Figure 18:
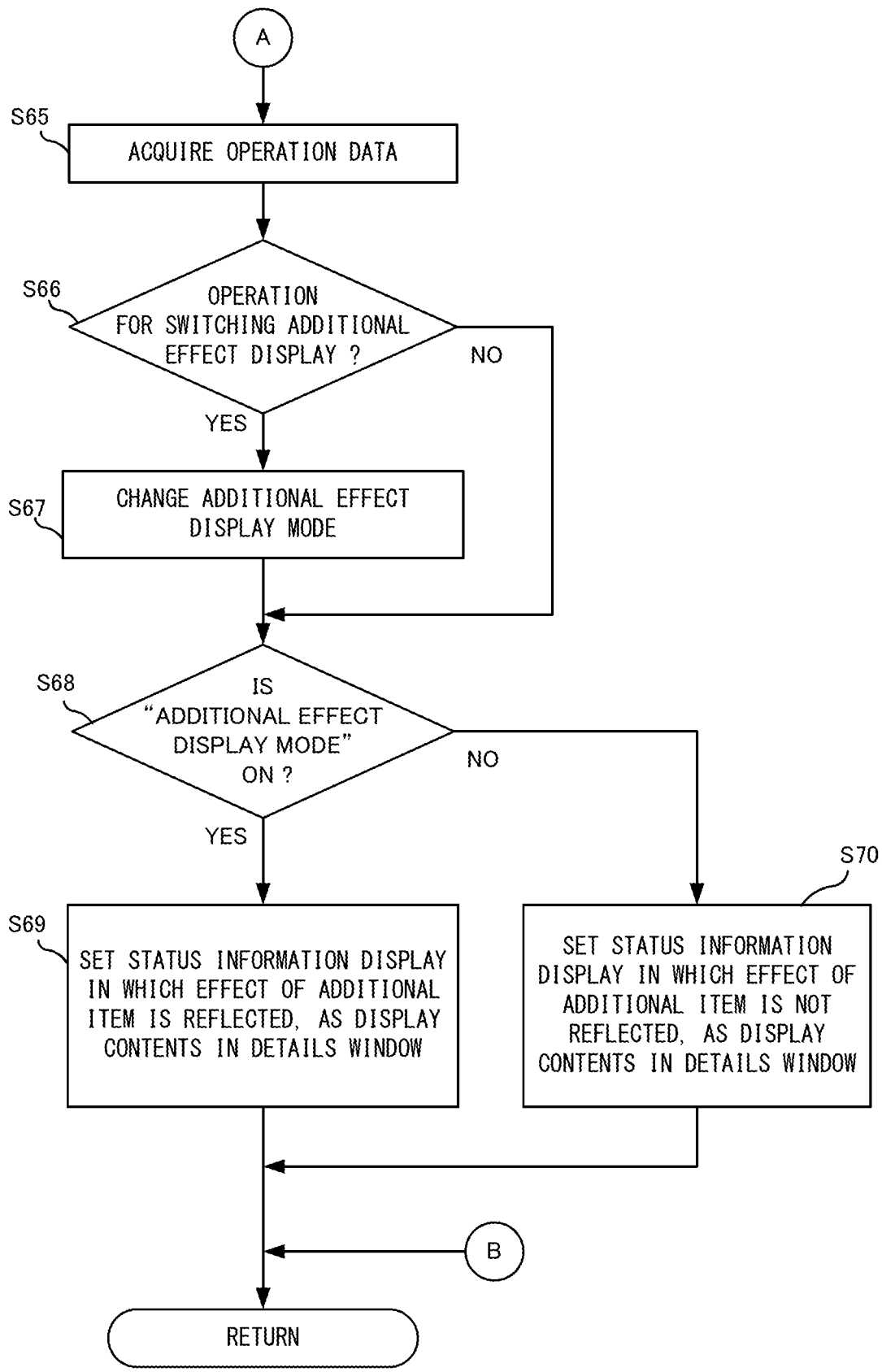
FIG. 18 is a flowchart showing the details window setting process in detail.

Referring back to FIG. 15, next, in step S33, the processor 81 executes a details window setting process. This process is a process for setting display contents in the details window 106. FIG. 17 is a flowchart showing the details window setting process in detail. First, in step S61, the processor 81 acquires the operation data 308. Next, in step S62, the process 81 determines whether the operation content indicated by the operation data 308 is an instruction operation for switching between the status tab 111 and the item details tab 112 in the details window 106. As a result of the determination, if a switching instruction operation has been performed (YES in step S62), in step S63, the processor 81 changes the content of the currently selected details tab information 312 in accordance with the operation content. That is, the processor 81 sets the "status detailed information display" or the "item detailed information display" in the currently selected details tab information 312 in accordance with the operation content. On the other hand, as a result of the determination in step S62, if an instruction operation for switching between the tabs has not been performed (NO in step S62), the processor 81 skips the process in step S63 and proceeds to the next process.

Next, in step S64, the processor 81 refers to the currently selected details tab information 312 and determines whether the currently selected tab is the status tab 111 or the item details tab 112. As a result of the determination, if the currently selected tab is the status tab 111 (YES in step S64), the processor 81 subsequently acquires the operation data 308 in step S65 in FIG. 18. Next, in step S66, the processor 81 determines whether the operation content is an ON/OFF operation on the effect display switching button 115, that is, an operation for switching ON/OFF of the above-described additional effect display. As a result of the determination, if the operation content is an ON/OFF operation on the effect display switching button 115 (YES in step S66), in step S67, the processor 81 changes the content of the additional effect display mode 313 on the basis of the operation content. That is, the processor 81 sets "ON" or "OFF" in the additional effect display mode 313 (switches between "ON" and "OFF") on the basis of the operation content.

On the other hand, as a result of the determination in step S66, if the operation content is not a switching operation (NO in step S66), the processor 81 skips the process in step S67 and proceeds to the next process.

Next, in step S68, the processor 81 refers to the additional effect display mode 313 and determines whether "ON" is set. As a result of the determination, if "ON" is set (YES in step S68), in step S69, the processor 81 sets display contents as shown in FIG. 4 or FIG. 6 in which the effect of the additional item is reflected, as display contents in the status change display area 113. For example, the processor 81 performs display content setting such that a value obtained by adding the total value of the ability value of the wearing item in the currently selected state and the ability value of the additional item to the value indicated by the basic status information 305 is displayed as a value after change. Then, the processor 81 ends the details window setting process.

On the other hand, as a result of the determination in step S68, if "ON" is not set (NO in step S68), in step S70, the processor 81 sets display contents as shown in FIG. 7 or FIG. 8 in which the effect of the additional item is not reflected, as display contents in the status change display area 113. For example, the processor 81 performs display content setting such that a value obtained by adding the ability value of the wearing item in the currently selected state to the value indicated by the basic status information 305 is displayed as a value after change. Then, the processor 81 ends the details window setting process.

Referring back to FIG. 17, as a result of the determination in step S64, if the currently selected tab is the item details tab 112 (NO in step S64), in step S71, the processor 81 sets contents indicating item details information as shown in FIG. 9, as display contents in the details window 106. Furthermore, in step S72, the processor 81 performs setting for displaying a detailed information window for the wearing item currently set to the currently selected part of the player object 102. Here, the layout of display contents in the detailed information window is the same as shown in FIG. 9. Accordingly, the performance of the currently set item and the wearing item in the currently selected state can be displayed in the same screen layout, so that the visibility and convenience when comparing these items are enhanced.

Thereafter, the processor 81 ends the details window setting process.

[Selection Fixing Process]

Figure 19:
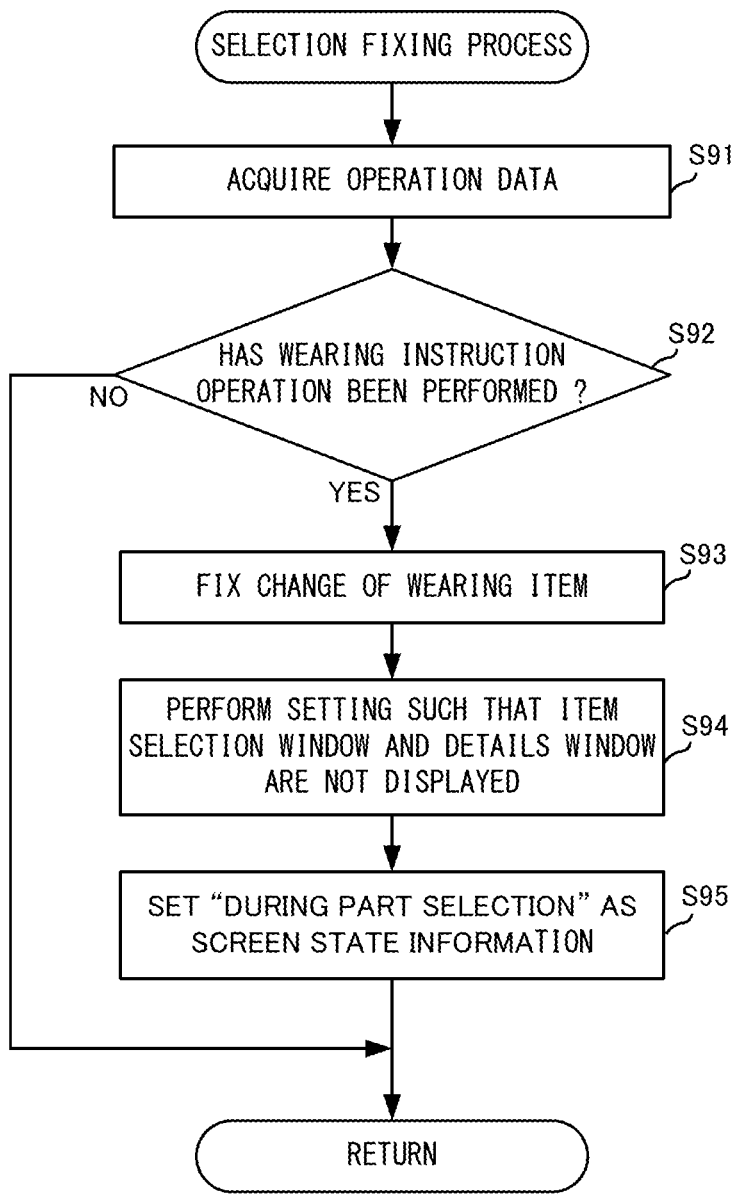
FIG. 19 is a flowchart showing a selection fixing process in detail.

Referring back to FIG. 15, next, in step S34, the processor 81 executes a selection fixing process. This process is a process for fixing a wearing item to be changed, on the basis of a wearing instruction operation of the player. FIG. 19 is a flowchart showing the selection fixing process in detail. In FIG. 19, first, in step S91, the processor 81 acquires the operation data 308. Next, in step S92, the processor 81 determines whether the operation content is a wearing instruction operation, that is, an operation for fixing selection of a wearing item. As a result of the determination, if the operation content is not a wearing instruction operation (NO in step S92), the processor 81 ends the selection fixing process. On the other hand, if a wearing instruction operation has been performed (YES in step S92), in step S93, the processor 81 executes a process of setting the wearing item in the currently selected state to the player object 102. Specifically, the processor 81 changes the content of the currently worn item information 307 for the currently selected part such that the content is the wearing item in the currently selected state.

Next, in step S94, the processor 81 performs display setting such that the item selection window 105 and the details window 106 are deleted from the screen. Then, in step S95, the processor 81 sets "during part selection" as the screen state information 309. Then, the processor 81 ends the selection fixing process. Accordingly, the processor 81 also ends the change item selection process.

Referring back to FIG. 13, next, in step S5, the processor 81 generates a game image on the basis of the display contents set in step S3 or S4, and outputs the game image to the display 12.

Next, in step S6, the processor 81 refers to the operation data 308 and determines whether an operation for ending the process regarding the "equipment change" has been performed. If an ending operation has not been performed (NO in step S6), the processor 81 returns to step S2 and repeats the process. On the other hand, if an ending operation has been performed (YES in step S6), the processor 81 ends the wearing item change UI process.

This is the end of the detailed description of the wearing item change UI process.

As described above, in the exemplary embodiment, in the UI for changing a wearing item, it is possible to switch between two display modes, that is, the above-described "effect reflection mode" and "effect non-reflection mode". By switching to the "effect reflection mode", it is possible to confirm and compare changes in the performance parameters of the player object in which the additional item is reflected. Meanwhile, by switching to the "effect non-reflection mode", it is possible to confirm and compare changes in the performance parameters on the basis of the performance of the wearing item itself. Since it is possible to switch between such two display modes, changes in the performance parameters due to the presence/absence of the additional item are easily compared, and a UI that improves user's convenience for such change of a wearing item can be provided. In particular, further improvement of the convenience can be expected as the number of kinds of wearing items or kinds of additional items is increased. If the number of wearing items or additional items possessed is increased, the player cannot grasp what additional item is set to which wearing item, and it is also expected that management of these items will become complicated. In such a case, by providing a UI as in the exemplary embodiment, it is possible to reduce the burden on the player's judgment and operation regarding change of wearing items and replacement of additional items.

MODIFICATIONS

In the above-described example, the case where each wearing item has the above-described slot and one additional item is set in one slot is assumed (number of slots=number of additional items that can be set). The mode for setting the additional item to a wearing item is not limited thereto. For example, a size or cost may be set for each additional item, and a maximum size or maximum cost that can be set may be set for the slot. It may be possible to set a plurality of additional items in each slot as long as the maximum size or maximum cost for the slot is not exceeded. For example, when one certain slot is configured such that it is possible to set additional items up to a maximum cost of 10 in the slot, a plurality of additional items may be able to be set in the slot as long as the cost is within the range of 10.

Regarding ON/OFF of display in which an additional item effect is reflected, in the above example, the example of switching between reflection and non-reflection has been described. In another exemplary embodiment, a reflection display in which an additional item effect is reflected and a non-reflection display in which the additional item effect is not reflected may be shown in combination. For example, as the display contents in the status change display area 113 in FIG. 5, the current value and the value after change may be displayed in two rows, and a content in which an additional item effect is reflected and a content in which the additional item effect is not reflected may be displayed in the upper row and the lower row, respectively. Alternatively, the content in which the additional item effect is reflected and the content in which the additional item effect is not reflected may be displayed in different windows aligned side by side. Still alternatively, it may be possible to switch ON/OFF of such a combined display.

In the above example, the case of changing an equipment item (weapon or protector) in a fantasy RPG has been described as an example. However, as a matter of course, the processing of the exemplary embodiment can be applied to games of other genres. For example, in a game such as a robot battle action game, the case where the player object 102 has a motif of a robot is assumed. Furthermore, it is assumed that the robot includes a plurality of parts such as a head part, arm parts, and a body part, and it is possible to change each part. Each part has a slot as described above, and it is possible to set the above-described additional item in each slot. The processing of the exemplary embodiment can be applied to such a game. In addition, the processing of the exemplary embodiment can be applied to games in each of which there are wearing items that are attachable to and detachable from the player object 102 and it is possible to set the above-described additional item to each wearing item.

In the above example, the game system has been described as an example of the information processing system. However, the processing according to the exemplary embodiment can be applied to a game apparatus having a single structure and an information processing apparatus such as a smartphone, a tablet type information processing apparatus, and a personal computer.

In the above embodiment, the case where the series of processes according to the game processing are performed in a single apparatus has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

In addition, a so-called cloud gaming configuration may be adopted. For example, the main body apparatus 2 may be configured to send operation data indicating a user's operation to a predetermined server, and the server may be configured to execute various kinds of game processing and stream the execution results as video/audio to the main body apparatus 2.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A non-transitory computer-readable storage medium having stored therein a game program causing a computer of a processing apparatus to provide execution comprising:
    making a selection from among wearing items each of which is set so as to be changeable with respect to a player object in a game and adds a change to a parameter regarding ability of the player object in the game on the basis of a set effect, on the basis of a selection operation input;
    generating a user interface showing the currently selected wearing item and showing a change in the parameter in a case where the wearing item set to the player object is changed to the currently selected wearing item, from a state where the wearing item set to the player object is not changed,
to at least one of the wearing items, an additional item that is added so as to be attachable to or detachable from the wearing item and for which an effect of adding a change to the parameter independently of the wearing item is set, being set;
switching between a first display, showing a change in the parameter such that the effect of the wearing item and the effect of the additional item set to the wearing item are reflected, and a second display showing a change in the parameter such that the effect of the additional item is not reflected and the effect of the wearing item is reflected, in the user interface on the basis of a first switching instruction input; and
setting the selected wearing item to the player object on the basis of a wearing instruction input.

2. The non-transitory computer-readable storage medium according to claim 1, wherein
frames for setting the additional item are individually set for the wearing items,
the additional item is capable of being added to the wearing item within a range where the frame is not exceeded, and
the game program further causes the computer to set the additional item to the wearing item on the basis of an addition instruction input.

3. The non-transitory computer-readable storage medium according to claim 1, wherein
parts are set in the player object, and
the wearing item is set to each of the parts.

4. The non-transitory computer-readable storage medium according to claim 1, wherein the game program further causes the computer to switch between a parameter change display by the first display or the second display and an item details display showing detailed information about the currently selected wearing item itself, in the user interface on the basis of a second switching instruction input different from the first switching instruction input.

5. The non-transitory computer-readable storage medium according to claim 4, wherein the detailed information about the currently selected wearing item itself and detailed information about the wearing item itself currently set to the player object are displayed in the item details display.

6. A game apparatus, comprising:
a processor; and
a memory configured to store computer readable instructions that, when executed by the processor, cause the game apparatus to provide execution comprising:
making a selection from among wearing items each of which is set so as to be changeable with respect to a player object in a game and adds a change to a parameter regarding ability of the player object in the game on the basis of a set effect, on the basis of a selection operation input from an operation device;
generating a user interface showing the currently selected wearing item and showing a change in the parameter in a case where the wearing item set to the player object is changed to the currently selected wearing item, from a state where the wearing item set to the player object is not changed,
to at least one of the wearing items, an additional item that is added so as to be attachable to or detachable from the wearing item and for which an effect of adding a change to the parameter independently of the wearing item is set, being set;
switching between a first display, showing a change in the parameter such that the effect of the wearing item and the effect of the additional item set to the wearing item are reflected, and a second display showing a change in the parameter such that the effect of the additional item is not reflected and the effect of the wearing item is reflected, in the user interface on the basis of a first switching instruction input; and
setting the selected wearing item to the player object on the basis of a wearing instruction input.

7. The game apparatus according to claim 6, wherein
frames for setting the additional item are individually set for the wearing items,
the additional item is capable of being added to the wearing item within a range where the frame is not exceeded, and
the processor further sets the additional item to the wearing item on the basis of an addition instruction input.

8. The game apparatus according to claim 6, wherein
parts are set in the player object, and
the wearing item is set to each of the parts.

9. The game apparatus according to claim 6, wherein the processor further switches between a parameter change display by the first display or the second display and an item details display showing detailed information about the currently selected wearing item itself, in the user interface on the basis of a second switching instruction input different from the first switching instruction input.

10. The game apparatus according to claim 9, wherein the detailed information about the currently selected wearing item itself and detailed information about the wearing item itself currently set to the player object are displayed in the item details display.

11. A game system, comprising:
an input portion; and
processing circuitry having at least one processor, wherein the processing circuitry is configured to:
make a selection from among wearing items each of which is set so as to be changeable with respect to a player object in a game and adds a change to a parameter regarding ability of the player object in the game on the basis of a set effect, on the basis of a selection operation input from the operation device;
generate a user interface showing the currently selected wearing item and showing a change in the parameter in a case where the wearing item set to the player object is changed to the currently selected wearing item, from a state where the wearing item set to the player object is not changed,
to at least one of the wearing items, an additional item that is added so as to be attachable to or detachable from the wearing item and for which an effect of adding a change to the parameter independently of the wearing item is set, being set;
switch between a first display, showing a change in the parameter such that the effect of the wearing item and the effect of the additional item set to the wearing item are reflected, and a second display showing a change in the parameter such that the effect of the additional item is not reflected and the effect of the wearing item is reflected, in the user interface on the basis of a first switching instruction input; and set the selected wearing item to the player object on the basis of a wearing instruction input.

12. The game system according to claim 11, wherein frames for setting the additional item are individually set for the wearing items, the additional item is capable of being added to the wearing item within a range where the frame is not exceeded, and the processing circuitry is further configured to set the additional item to the wearing item on the basis of an addition instruction input.

13. The game system according to claim 11, wherein parts are set in the player object, and the wearing item is set to each of the parts.

14. The game system according to claim 11, wherein the processing circuitry is further configured to switch between a parameter change display by the first display or the second display and an item details display showing detailed information about the currently selected wearing item itself, in the user interface on the basis of a second switching instruction input different from the first switching instruction input, and the detailed information about the currently selected wearing item itself and detailed information about the wearing item itself currently set to the player object are displayed in the item details display.

15. A game processing method executed by a computer configured to control a processing system, the game processing method comprising:

making a selection from among wearing items each of which is set so as to be changeable with respect to a player object in a game and adds a change to a parameter regarding ability of the player object in the game on the basis of a set effect, on the basis of a selection operation input;

generating a user interface showing the currently selected wearing item and showing a change in the parameter in a case where the wearing item set to the player object is changed to the currently selected wearing item, from a state where the wearing item set to the player object is not changed, to at least one of the wearing items, an additional item that is added so as to be attachable to or detachable from the wearing item and for which an effect of adding a change to the parameter independently of the wearing item is set, being set;

switching between a first display, showing a change in the parameter such that the effect of the wearing item and the effect of the additional item set to the wearing item are reflected, and a second display showing a change in the parameter such that the effect of the additional item is not reflected and the effect of the wearing item is reflected, in the user interface on the basis of a first switching instruction input; and setting the selected wearing item to the player object on the basis of a wearing instruction input.

16. The game processing method according to claim 15, wherein frames for setting the additional item are individually set for the wearing items, the additional item is capable of being added to the wearing item within a range where the frame is not exceeded, and the game processing method further comprising setting the additional item to the wearing item on the basis of an addition instruction input.

17. The game processing method according to claim 15, wherein parts are set in the player object, and the wearing item is set to each of the parts.

18. The game processing method according to claim 15, further comprising:

switching between a parameter change display by the first display or the second display and an item details display showing detailed information about the currently selected wearing item itself, in the user interface on the basis of a second switching instruction input different from the first switching instruction input, wherein the detailed information about the currently selected wearing item itself and detailed information about the wearing item itself currently set to the player object are displayed in the item details display.

19. The non-transitory computer-readable storage medium according to claim 1, wherein the first display corresponds to an effect reflection mode in which the effect of the wearing item and the effect of the additional item set to the wearing item are reflected, the second display corresponds to an effect non-reflection mode in which the effect of the additional item is not reflected and the effect of the wearing item is reflected, and selection of a selectable object corresponding to the first switching instruction input causes switching between the first display, corresponding to the effect reflection mode, and the second display corresponding to the effect non-reflection mode.

20. The non-transitory computer-readable storage medium according to claim 1, wherein selection of a selectable object in the user interface causes switching between the first display, in which the effect of the wearing item and the effect of the additional item set to the wearing item are reflected, and the second display, in which the effect of the additional item is not reflected and the effect of the wearing item is reflected.

* * * * *